United States Patent
Chu et al.

(10) Patent No.: US 9,854,468 B2
(45) Date of Patent: Dec. 26, 2017

(54) METHOD AND APPARATUS FOR ESTIMATING DISTANCE BETWEEN NETWORK DEVICES IN A WIRELESS NETWORK

(71) Applicant: Marvell World Trade Ltd., St. Michael (BB)

(72) Inventors: Liwen Chu, San Ramon, CA (US); Sagar A. Tamhane, Santa Clara, CA (US); Sarang Shrikrishna Wagholikar, Sunnyvale, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 221 days.

(21) Appl. No.: 14/639,450

(22) Filed: Mar. 5, 2015

(65) Prior Publication Data
US 2015/0257028 A1    Sep. 10, 2015

Related U.S. Application Data

(60) Provisional application No. 61/948,364, filed on Mar. 5, 2014.

(51) Int. Cl.
*H04W 64/00* (2009.01)
*H04W 24/10* (2009.01)
(Continued)

(52) U.S. Cl.
CPC .............. *H04W 24/10* (2013.01); *G01S 13/74* (2013.01); *H04L 67/104* (2013.01);
(Continued)

(58) Field of Classification Search
CPC .................................................. H04W 24/10
See application file for complete search history.

(56) References Cited

U.S. PATENT DOCUMENTS

| 2005/0026563 A1 | 2/2005 | Leeper et al. |
| 2005/0058081 A1 | 3/2005 | Elliott |

(Continued)

OTHER PUBLICATIONS

IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

(Continued)

*Primary Examiner* — Benjamin Lamont

(57) ABSTRACT

A first wireless communication device including a timing module and a fine timing measurement module. The timing module is configured to provide a first timer value. The fine timing measurement module is configured to receive, from a second wireless communication device, a first request to perform a fine timing measurement to determine a distance between the first wireless communication device and the second wireless communication device, and transmit a first response including a first time to start a burst period for performing the fine timing measurement. The first time is one of included in the request received from the second wireless communication device and based on the first timer value. The fine timing measurement module is further configured to perform the fine timing measurement in the burst period starting at the first time.

12 Claims, 7 Drawing Sheets

(51) Int. Cl.
H04L 29/08 (2006.01)
H04W 4/00 (2009.01)
G01S 13/74 (2006.01)
H04W 84/12 (2009.01)

(52) U.S. Cl.
CPC ............ *H04W 4/006* (2013.01); *H04W 64/00* (2013.01); *H04W 84/12* (2013.01)

(56) References Cited

U.S. PATENT DOCUMENTS

| | | | | |
|---|---|---|---|---|
| 2014/0044118 | A1* | 2/2014 | Kim | H04W 56/0075 370/338 |
| 2014/0160959 | A1* | 6/2014 | Aldana | H04L 43/0864 370/252 |
| 2014/0187259 | A1* | 7/2014 | Kakani | H04W 64/00 455/456.1 |
| 2014/0198725 | A1* | 7/2014 | Abraham | H04L 67/16 370/328 |
| 2014/0269549 | A1* | 9/2014 | Stephens | H04W 74/0891 370/329 |
| 2014/0301375 | A1* | 10/2014 | Nusairat | H04W 56/0005 370/336 |
| 2014/0355462 | A1* | 12/2014 | Aldana | G01S 5/00 370/252 |
| 2015/0099538 | A1* | 4/2015 | Wang | H04W 4/02 455/456.1 |
| 2015/0139212 | A1* | 5/2015 | Wang | G01S 5/06 370/338 |
| 2016/0044524 | A1* | 2/2016 | Ben-Haim | G01S 5/14 370/252 |
| 2016/0205576 | A1* | 7/2016 | Segev | H04W 56/0045 370/253 |

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 pages.

IEEE P802.11ah™/D1.0 Draft Standard for Information technology—Telecommunications and information exchange between systems Local and metropolitan area networks—Specific requirements Part 11: Wireless LAN Medium Access Control (MAC) and Physical Layer (PHY) Specifications, Amendment 6: Sub 1 GHz License Exempt Operation, 802.11 Working Group of the LAN/MAN Standards Committee of the IEEE Computer Society, Oct. 2013, 394 pages.

Wi-Fi Alliance Wireless Network Management Marketing Task Group. "Marketing Requirements Document for Interoperability Testing of Wi-Fi Location Capabilities Version 0.01." Wi-Fi Alliance (Jan. 2013): 27 Pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

Carlos Aldana (Qualcomm Corporation): "IEEE P802.11 Wireless LANs Proposed Resolutions to Comments CID 2164"IEEE Draft; doc.: IEEE 802.11-14/0160r0, IEEE SA Mentor, Piscataway, NJ USA, vol. 802.11m, Jan. 22, 2014 (Jan. 22, 2014), pp. 1-12.

Carlos Aldana (Qualcomm): IEEE P802.11Wireless LANs "802.11-2012 CID 46 47 48 Regarding Fine Timing Measurement; 11-12-1249-04-000m", IEEE SA Mentor; IEEE-SA Mentor, Piscataway, NJ USA, vol. 802.11m, No. 4, Jan. 17, 2013 (Jan. 17, 2013), pp. 1-17.

Notification of International Search Report and Written Opinion dated Jul. 9, 2015 corresponding to International Application No. PCT/US2015/018955, 13 pages.

* cited by examiner

METHOD AND APPARATUS FOR ESTIMATING DISTANCE BETWEEN NETWORK DEVICES IN A WIRELESS NETWORK

CROSS-REFERENCE TO RELATED APPLICATIONS

This application claims the benefit of U.S. Provisional Application No. 61/948,364, filed on Mar. 5, 2014. The entire disclosure of the application referenced above is incorporated herein by reference.

FIELD

The present disclosure relates to systems and methods for performing a range measurement in a wireless network using a fine timing measurement procedure.

BACKGROUND

The Institute of Electrical and Electronics Engineers (IEEE) has developed several 802.11X specifications that define communication protocols used by network devices operating in wireless local area networks (WLANs). For example, the communication protocols include authentication schemes that can be used to securely exchange data between the network devices. The communication protocols include power-saving strategies that can be used to save power in the network devices. The communication protocols include synchronization schemes to synchronize clocks of the network devices, and so on. Some protocols include a fine timing measurement (FTM) procedure used to measure the time of flight (ToF) of a radio frequency (RF) signal between two network devices. The ToF is used to measure a range (i.e., distance) between the network devices.

FIG. 1 shows an example FTM procedure used to measure ToF between two network devices—client stations STA1 and STA2—operating in a WLAN. STA2 initiates an FTM request by sending a request frame (FTM request) to STA1. STA1 receives the FTM request at time t0 and responds by sending a corresponding acknowledgment frame (ACK). The FTM request and the corresponding acknowledgement frame are followed by STA1 sending an FTM response frame (FTM_1) to STA2. The FTM response frame leaves a transmit antenna of STA1 at time t1 and arrives at a receive antenna of STA2 at time t2. STA1 and STA2 may measure timestamps indicative of when the FTM response frame leaves the transmit antenna from STA1 (t1) and when the FTM response frame arrives at the receive antenna at STA2 (t2). STA2 responds by sending an acknowledgement frame to STA1. The ACK frame leaves a transmit antenna of STA2 at time t3 and arrives at a receive antenna of STA1 at time t4. STA2 and STA1 measure timestamps indicative of when the ACK frame leaves the transmit antenna of STA2 (t3) and when the ACK frame arrives at the receive antenna of STA1 (t4).

The FTM response frame includes several parameters that describe the range measurement bursts, including a burst offset field (i.e., a field that indicates a value of a burst offset). STA2 transmits the FTM request to trigger the first FTM burst at a time indicated by the burst offset field of the FTM Response. The burst offset corresponds to a duration (e.g., 10 ms) between reception of the FTM request by STA1 and a start of the first burst period. Accordingly, the burst offset provides an indication, to the stations STA1 and STA2, of the start of the first burst period. The stations perform the FTM based on frames transmitted during the burst period. The burst period corresponds to a duration between a start of one burst period (e.g., burst period 1) to a start of a next burst period (e.g., burst period 2).

For example, STA2 transmits another FTM request to STA1 at the start of the burst period 1 to notify STA1 that STA2 is ready to receive FTM frames for range measurement. STA1 transmits an ACK and then provides t1 and t4 to STA2 in an FTM (FTM_2). STA2 calculates a round trip time (RTT), which is twice the ToF between STA1 and STA2, as RTT=(t4−t1)−(t3−t2)=(t2−t1)+(t4−t3). The ToF between STA1 and STA2 is RTT/2. STA2 can perform additional calculations based on transmitted frames and respective times in burst period 2.

SUMMARY

A first wireless communication device including a timing module and a fine timing measurement module. The timing module is configured to provide a first timer value. The fine timing measurement module is configured to receive, from a second wireless communication device, a first request to perform a fine timing measurement to determine a distance between the first wireless communication device and the second wireless communication device, and transmit a first response including a first time to start a burst period for performing the fine timing measurement. The first time is one of included in the request received from the second wireless communication device and based on the first timer value. The fine timing measurement module is further configured to perform the fine timing measurement in the burst period starting at the first time.

A method of operating a first wireless communication device includes providing a first timer value, receiving, from a second wireless communication device, a first request to perform a fine timing measurement to determine a distance between the first wireless communication device and the second wireless communication device, transmitting a first response including a first time to start a burst period for performing the fine timing measurement, wherein the first time is one of (i) included in the request received from the second wireless communication device and (ii) based on the first timer value, and performing the fine timing measurement in the burst period starting at the first time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
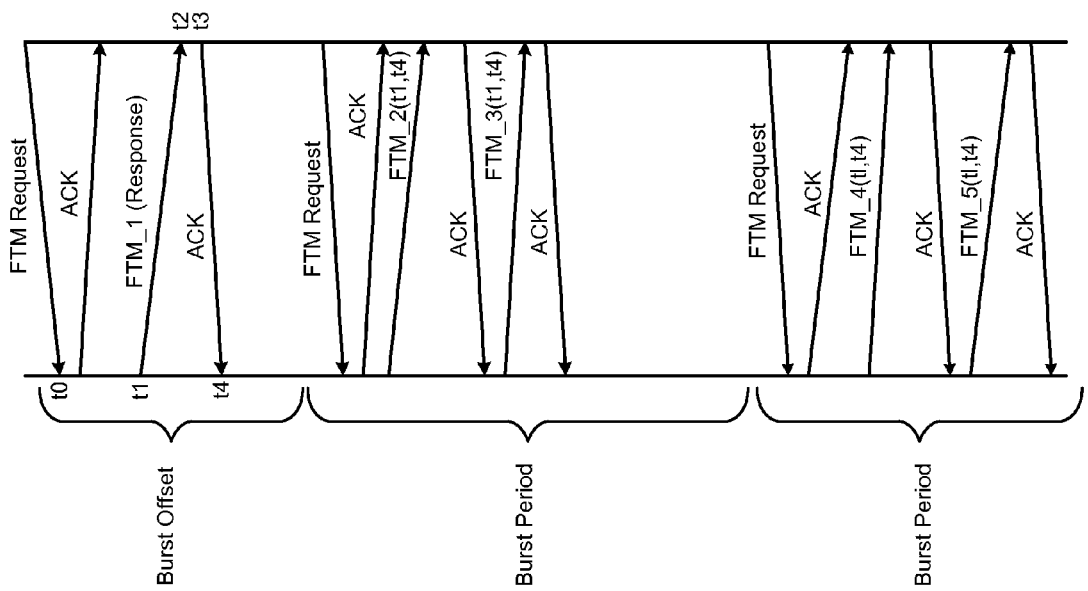
FIG. 1 illustrates an example a fine timing measurement (FTM) procedure.
Figure 2:
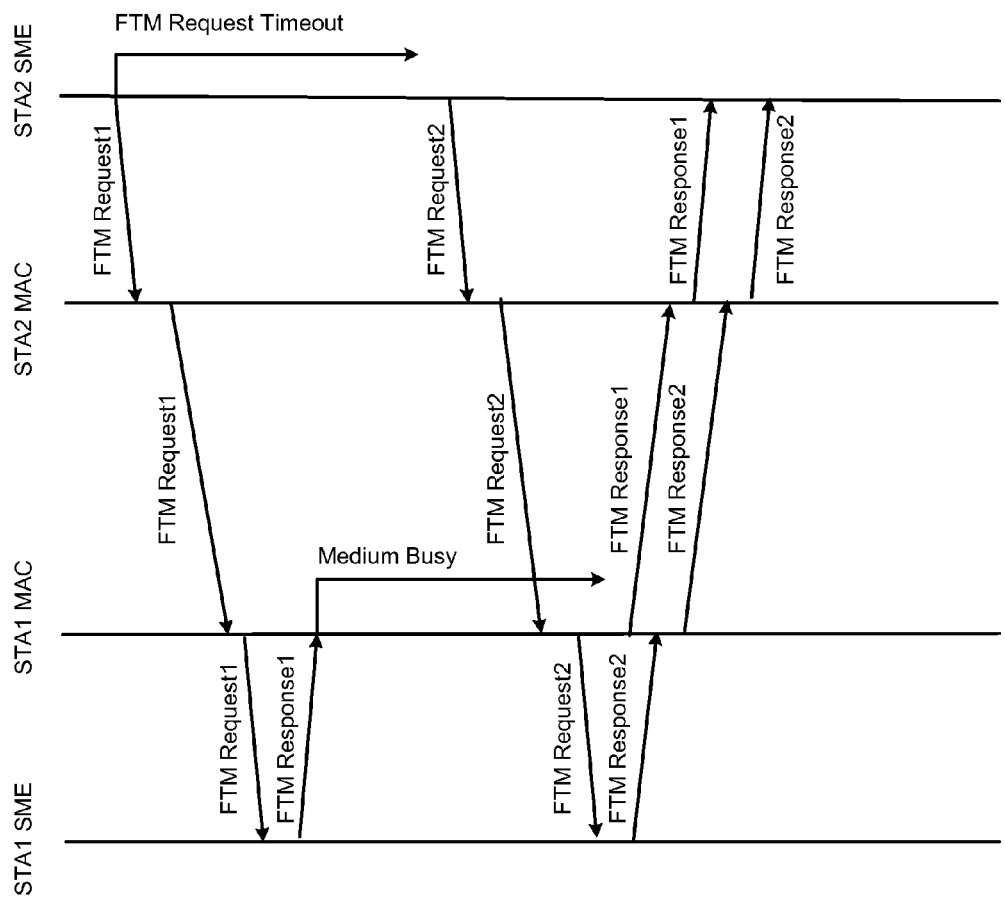
FIG. 2 illustrates an example mismatch in an FTM procedure.

FIG. 2 shows an example mismatch in an FTM procedure between stations STA1 and STA2. In FIG. 2, respective station management entity (SME) sublayers and medium access control (MAC) sublayers of the stations STA1 and STA2 are shown to illustrate additional communication between the sublayers. Transmission delays (e.g., delays due to a busy transmission medium) may cause an FTM request timeout prior to STA2 receiving the FTM Response frame from STA1. The FTM request timeout may cause a mismatch between FTM requests transmitted by STA2 and corresponding FTM responses transmitted by STA1. For example, the FTM request timeout may cause STA1 and STA2 to operate according to different burst offsets.

For example, STA2 transmits a first FTM request (FTM Request 1) to STA1, which is relayed from the SME to the MAC of STA2 and then provided to the SME of STA1 via the MAC of STA1. The SME of STA1 responds with a first FTM response (FTM Response 1) provided to the MAC of STA1. However, the MAC may not be able to access the transmission medium (e.g., the transmission medium may be busy). Accordingly, the MAC of STA 1 waits for the transmission medium to become free.

At STA2, the first FTM request may timeout if the FTM response is not received within a predetermined period. In the event of an FTM request timeout, STA2 may transmit a second FTM request (FTM request 2). As shown, STA1 receives the second FTM request prior to transmitting the first FTM response. If the transmission medium becomes free, STA1 may subsequently transmit both the first FTM response and the second FTM response to STA2. Accordingly, a mismatch occurs between the FTM requests transmitted by STA2 and the FTM responses transmitted by STA1.

Figure 3:
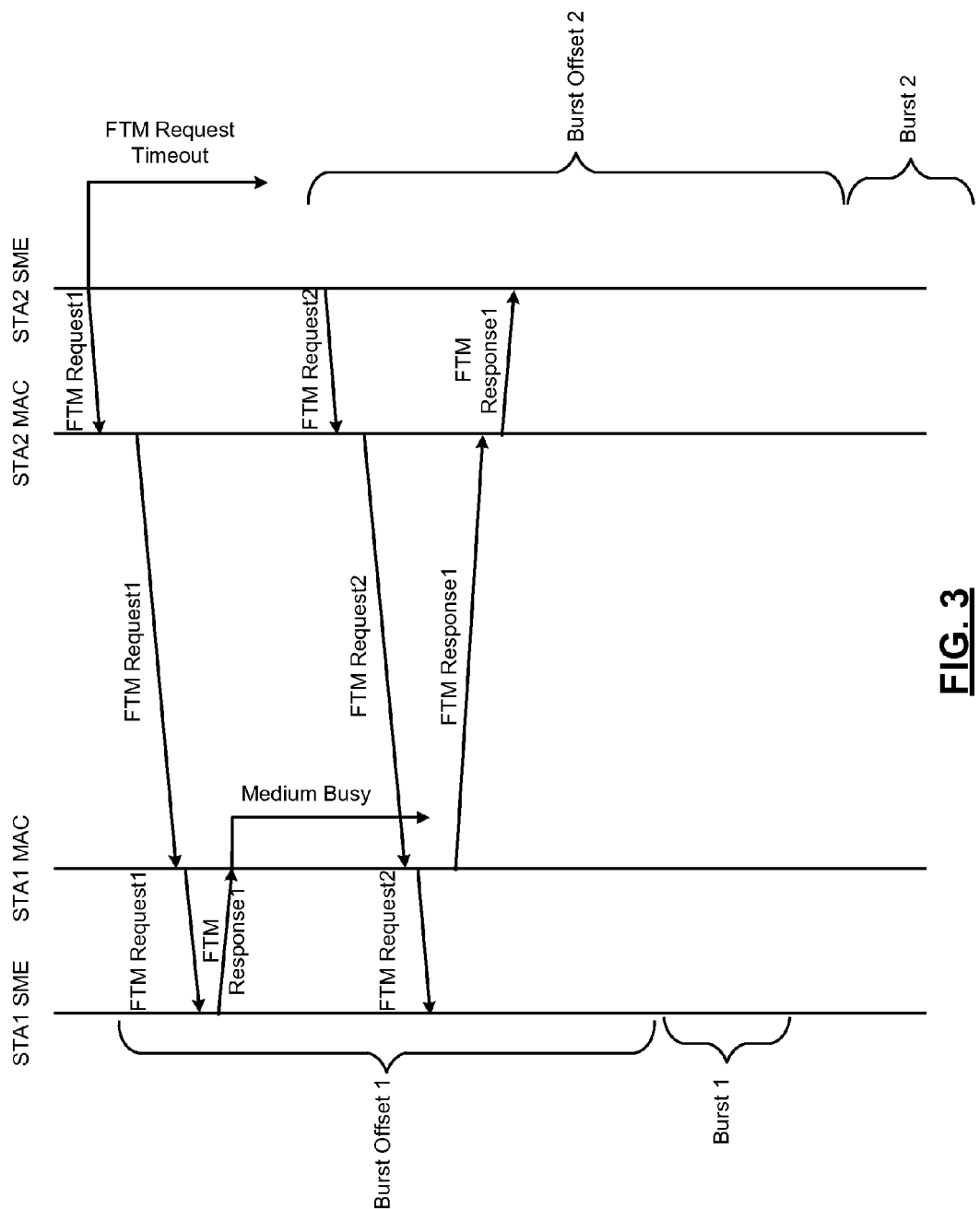
FIG. 3 illustrates an example mismatch between respective burst offsets caused by a mismatch between FTM requests and FTM responses.

FIG. 3 shows an example mismatch between respective burst offsets of STA1 and STA2 caused by a mismatch between FTM requests and FTM responses. For example, STA1 may determine a first burst offset (Burst Offset 1) according to the first FTM request. However, if the MAC of STA1 does not transmit the first FTM response (e.g., due to the transmission medium being busy) prior to the FTM request timeout at STA2, STA2 may transmit the second FTM request. STA1 may discard the second FTM request, and subsequently transmit the first FTM response upon the transmission medium becoming free. Accordingly, STA1 operates according to a first burst period (Burst 1) calculated using the first burst offset as determined by the first FTM request. Conversely, STA2 operates according to a second burst period (Burst 2) calculated using a second burst offset as determined by the second FTM request, resulting in a burst period mismatch.

Systems and methods according to the principles of the present disclosure prevent burst period mismatches caused by mismatches between FTM requests and FTM responses. For example, the FTM systems and methods may implement an absolute burst start time instead of using burst offsets. Although FTM systems and methods are described, the principles of the present disclosure may be applied to other time of flight (ToF) or range/distance measurement procedures.

Figure 4:
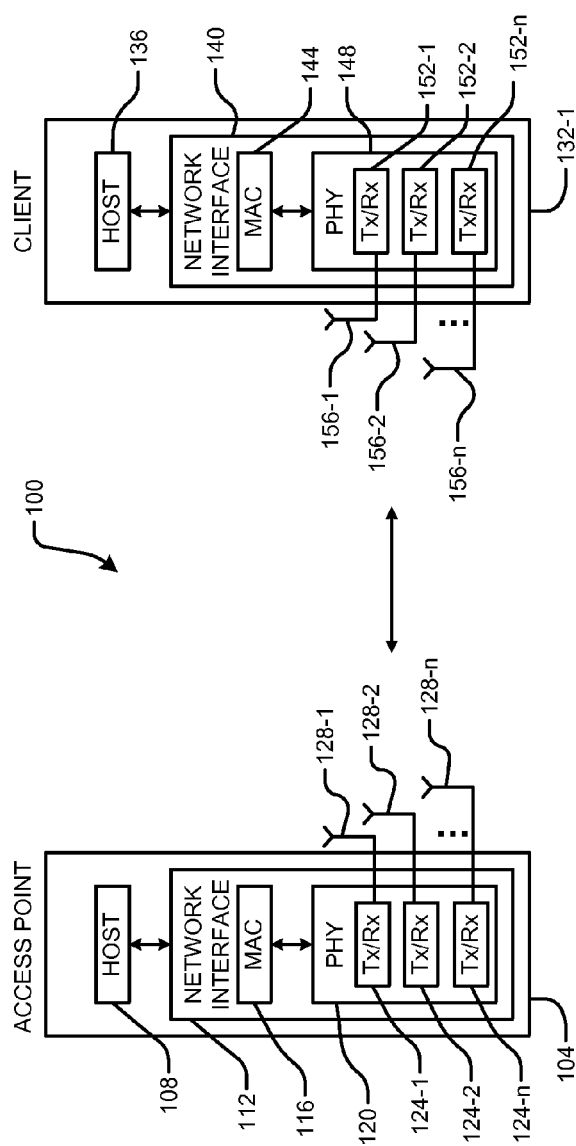
FIG. 4 is an example wireless local area network including one or more wireless communication devices.

FIG. 4 shows an example WLAN 100 including one or more wireless communication devices configured to implement systems and methods according to an embodiment of the present disclosure. The WLAN 100 includes an access point (AP) 104 having a host processor 108 in communication with a network interface 112. The network interface 112 includes a medium access control (MAC) device 116 and a physical layer (PHY) device 120. The PHY device 120 includes a plurality of transceivers 124-1, 124-2, . . . , and 124-n, referred to collectively as transceivers 124. The transceivers 124 communicate with respective antennas 128-1, 128-2, . . . , and 128-n, referred to collectively as antennas 128.

The AP 104 communicates with one or more client stations 132. The client station 132 includes a host processor 136 in communication with a network interface 140. The network interface 140 includes a MAC device 144 and a PHY device 148. The PHY device 148 includes a plurality of transceivers 152-1, 152-2, . . . , and 152-n, referred to collectively as transceivers 152. The transceivers 152 communicate with respective antennas 156-1, 156-2, . . . , and 156-n, referred to collectively as antennas 128. Although the WLAN 100 is described with respect to communication between an AP and a client station, the principles of the present disclosure also correspond to communication between APs, communication between client stations, etc.

The host processor 108, the MAC device 116, and/or the PHY device 120 of the AP 104 may be configured to transmit and receive FTM request, response, and acknowledgment frames according to the principles of the present disclosure. The transceivers 124 are configured to transmit the data/management/control frames via the respective antennas 128. The client station 132 is also configured to transmit and receive FTM request, response, and acknowledgment frames according to the principles of the present disclosure (e.g., via antennas 156). Each of the AP 104 and the client station 132 is configured to perform functions of an FTM procedure according to the principles of the present disclosure.

Figure 5:
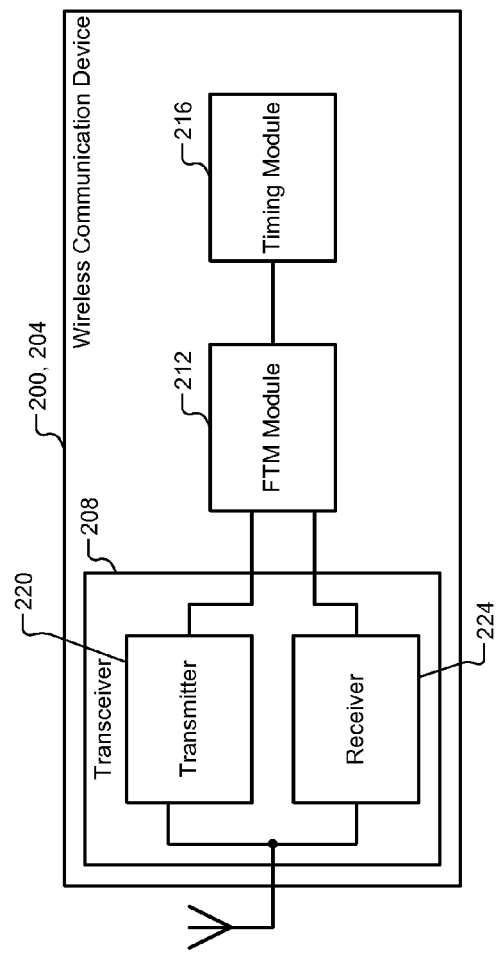
FIG. 5 is an example wireless communication device.

FIG. 5 shows example wireless communication devices (e.g., an AP and a client station, an AP and an AP, a client station and a client station, a station that is not associated with an AP and a station that is not associated with an AP, etc.) 200, 204 in detail. The devices 200, 204 each include a transceiver 208 (e.g., corresponding to one of the transceivers 128 or 152 as shown in FIG. 4), an FTM module 212, and a timing module 216. The transceiver 208 includes a transmitter 220 and a receiver 224. While only one antenna is shown, the devices 200, 204 may include multiple antennas (e.g., antennas arranged in a MIMO configuration) as shown in FIG. 4. The functions and operations of each of these modules of the devices 200, 204 are described below in detail with further reference to FIG. 5 and reference to FIGS. 6-11.

The FTM module 212 and the timing module 216 implement an FTM procedure according to the principles of the present disclosure. For example only, the FTM module 212 and the timing module 216 may implemented in one or more various components of the devices 200, 204, including, but not limited to, a PHY, MAC, or SME sublayer, a baseband processor, etc. The FTM module 212 performs various functions related to FTM negotiation between devices 200, 204, including, but not limited to, generation of FTM request, response, and acknowledgement frames for transmission and processing of received FTM request, response, and acknowledgement frames. The timing module 216 performs functions related to timing and timing calculations of the FTM procedure, such as providing timing measurements and calculations to the FTM module 212.

In an example embodiment, the FTM module 212 performs the FTM procedure based on an absolute burst start time (or, "burst start time"). Specifically, the devices 200, 204 determine a start of a burst period based on the absolute burst start time instead of a burst offset.

For example, in an embodiment, the requesting device (i.e., the device that transmits the FTM request) may include the burst start time, instead of the burst offset, in the FTM request. As shown in FIG. 5, the FTM module 212 of the requesting device may receive a burst start time from the timing module 216 and generate an FTM request including the burst start time. The burst start time may be selected according to, for example only, a common time shared between the requesting device and the receiving device. The receiving device (i.e., the device that receives the FTM request) may accept the burst start time provided by the requesting device or provide a different burst start time. For example, the FTM module 212 of the receiving device may accept the burst start time (i.e., continue with the FTM procedure according to the burst start time received in the FTM request) or receive a different burst start time from the timing module 216. The different burst start time may be selected according to, for example only, the common time shared between the requesting device and the receiving device. The FTM module 212 of the receiving device may then generate an FTM response including the different burst start time received from the timing module 216.

In another embodiment, the requesting device may not include a burst start time in the FTM request. Instead, the receiving device may simply provide an FTM response including a burst start time as received from the timing module 216 of the receiving device. For example only, the burst start time may be selected according to, for example only, the common time shared between the requesting device and the receiving device. For example only, the burst time may also be selected according to, for example only, the time the event occurred in the receiving device.

In any described example embodiment, the burst start time may correspond to a value of a timer implemented by the timing module 216. For example, the value may correspond to an absolute time, which may be measured using a reference time (e.g., such as a timing synchronization function (TSF) time). In a WLAN, the TSF is used to maintain synchronization of all devices in a same basic service set (BSS). Each device maintains its own TSF time. Devices exchange information (e.g., in beacon frames, etc.) that includes the TSF times of respective devices. Accordingly, devices may set their respective TSF times to a same value as other devices to maintain timing synchronization.

In the devices 200, 204, the timing module 216 may implement a timer that maintains the TSF time. The timing module 216 may provide a burst start time that corresponds to the TSF time of the respective device. For example, the burst start time may correspond to a TSF time equal to a predetermined time subsequent to the device's traffic behavior, power save behavior, a transmission time of the FTM request, subsequent to a reception time of the FTM request, subsequent to a transmission time of the FTM response, etc. Accordingly, because each of the devices 200, 204 has a synchronized TSF time, each of the devices 200, 204 will use the same absolute burst start time. The same burst start time may be included in each FTM request and FTM response transmitted during the FTM procedure.

Figure 6:
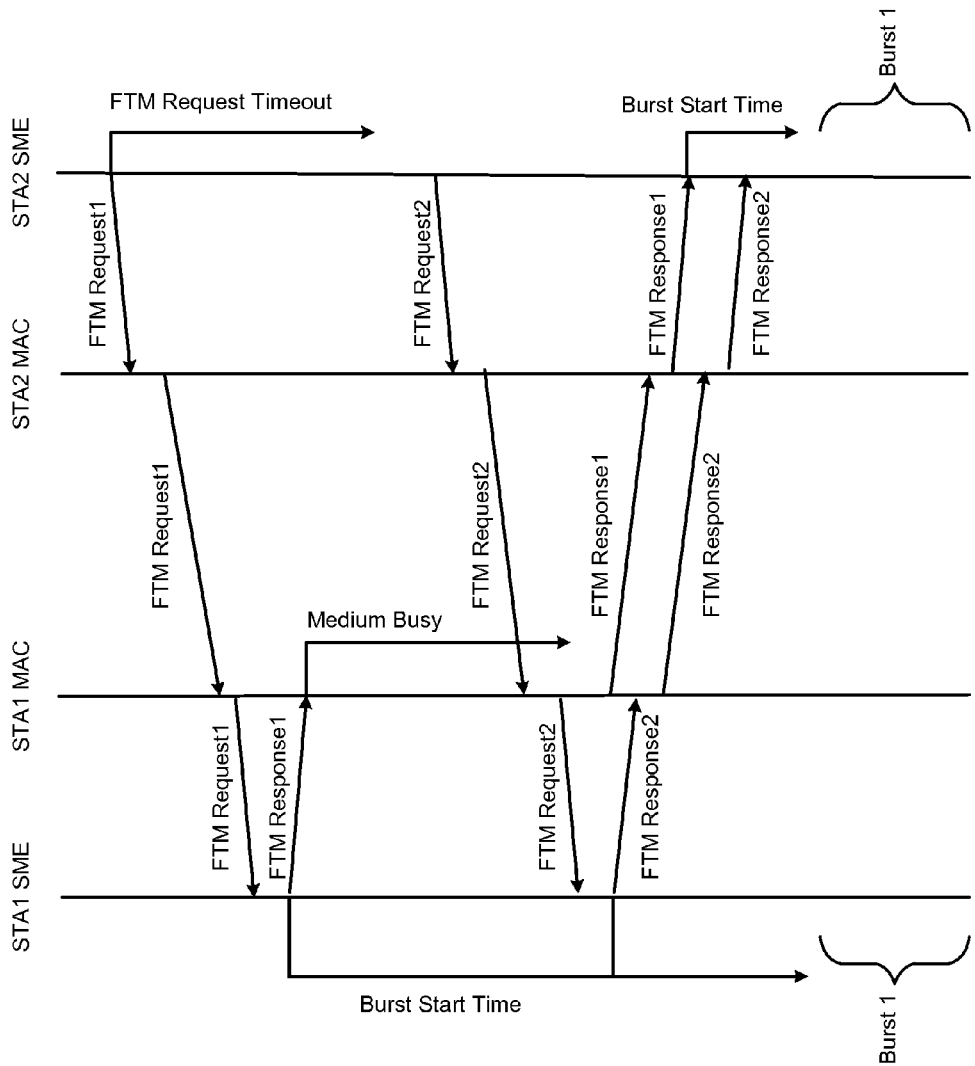
FIG. 6 illustrates an example FTM procedure using an absolute burst start time.
Figure 7:
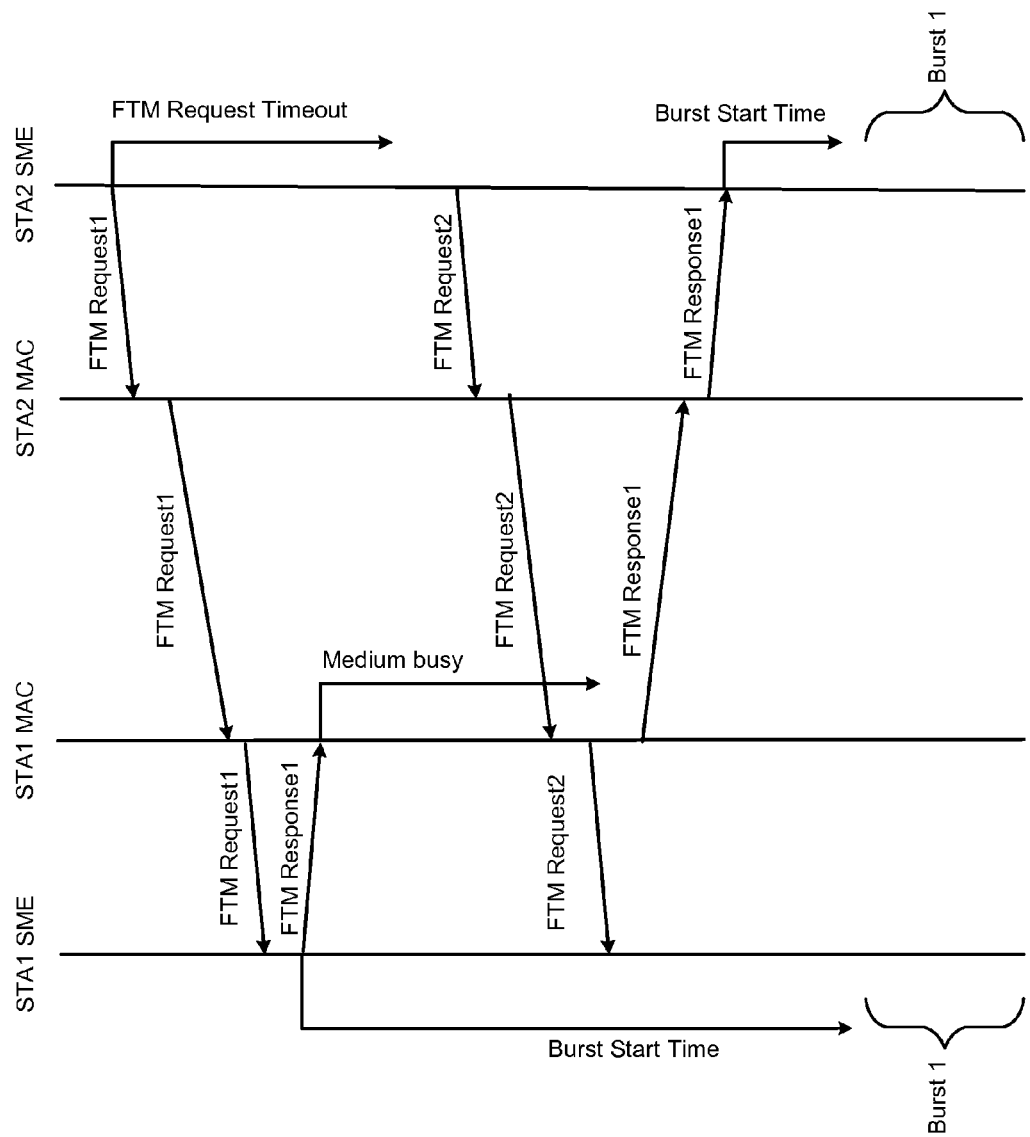
FIG. 7 illustrates another example FTM procedure using an absolute burst start time.

FIGS. 6 and 7 shows an example FTM procedure using an absolute burst start time (e.g., based on a TSF time) according to the principles of the present disclosure. STA2 transmits a first FTM request (FTM Request 1). The first FTM request may include an absolute burst start time based on a TSF time of STA2. The absolute burst start time may correspond to a transmission time of the first FTM request. In embodiments, the first FTM request may not include an absolute burst start time.

STA1 receives the FTM request and transmits a first FTM response (FTM Response 1) to STA2. The first FTM response includes an absolute burst start time. For example, if the first FTM request included an absolute burst start time provided by STA2, the first FTM response may include the absolute burst start time provided by STA2 or may include a different absolute burst start time (e.g., based on STA1's scheduled behavior in the future, traffic behavior, power save behavior). If the first FTM request did not include an absolute burst start time, the first FTM response will include an absolute burst start time provided by STA1.

Subsequent FTM requests and responses include whichever absolute burst start time was ultimately provided by STA1 in the first FTM response. Accordingly, even if the MAC of STA1 is not able to transmit the first FTM response (e.g., due to the transmission medium being busy), STA1 and STA2 still implement the FTM procedure using the same absolute burst start time. For example, if the first FTM request times out at STA2, causing STA2 to transmit a second FTM request (FTM Request 2), the first FTM response subsequently received by STA2 still includes the same absolute burst start time selected by STA1 in response to the first FTM request. Similarly, if STA1 transmits a second FTM response (FTM Response 2) in response to the second FTM request, the second FTM response also includes the absolute burst start time selected by STA1 in response to the first FTM request. As shown in FIG. 6, STA1 transmits a second FTM response. As shown in FIG. 7, STA1 discards the second FTM request and does not transmit a second FTM response. As such, both STA1 and STA2 continue with the FTM procedure with a burst period (Burst 1) that starts at the same time. In embodiments, a length of the FTM request timeout may also be increased (e.g., to greater than 10 ms, such as 512 ms, 1 s, etc.).

Respective TSF times of the devices 200, 204 may not be the same. Typically, one device updates its TSF time according to the TSF time of the other device. For example, if a first device is an AP or group owner (GO) and a second device is a station or client, then the second device updates its TSF time using the TSF time of the first device. In other words, the second device adopts the TSF time of the first device to maintain synchronization. Accordingly, the absolute burst start time corresponds to the TSF time of the AP or GO device.

Conversely, when each of the first device and the second device is a station or a client, neither TSF time corresponds to the TSF time of an AP or GO device, and therefore neither TSF time is adopted by the station or client device by default. In embodiments of the present disclosure, if both devices are stations or clients, the requesting station (e.g., STA2) uses the TSF time of the receiving station (e.g., STA1) as the reference time for the absolute burst start time and FTM procedure measurements. For example, STA1 transmits an FTM response including a burst start time corresponding to the TSF time of STA1. Accordingly, STA2 performs calculations related to FTM based on the TSF time (as represented by the burst start time) of STA1. During a subsequent burst period, STA1 and STA2 preferably do not change their respective TSF times to avoid affecting FTM measurements. If STA1 does change its TSF time, STA1 may provide an updated TSF time to STA2 via another FTM response.

Similarly, when each of the first device and the second device is an AP or GO, the requesting AP (e.g., AP2) uses the TSF time of the receiving AP (e.g., AP1) as the reference time for the absolute burst start time and FTM procedure measurements. For example, AP1 transmits an FTM response including a burst start time corresponding to the TSF time of AP1. Accordingly, AP2 performs calculations related to FTM based on the TSF time (as represented by the burst start time) of AP1. During a subsequent burst period, AP1 and AP2 preferably do not change their respective TSF times to avoid affecting FTM measurements. If AP1 does change its TSF time, AP1 may provide an updated TSF time to AP2 via another FTM response.

Figure 8:
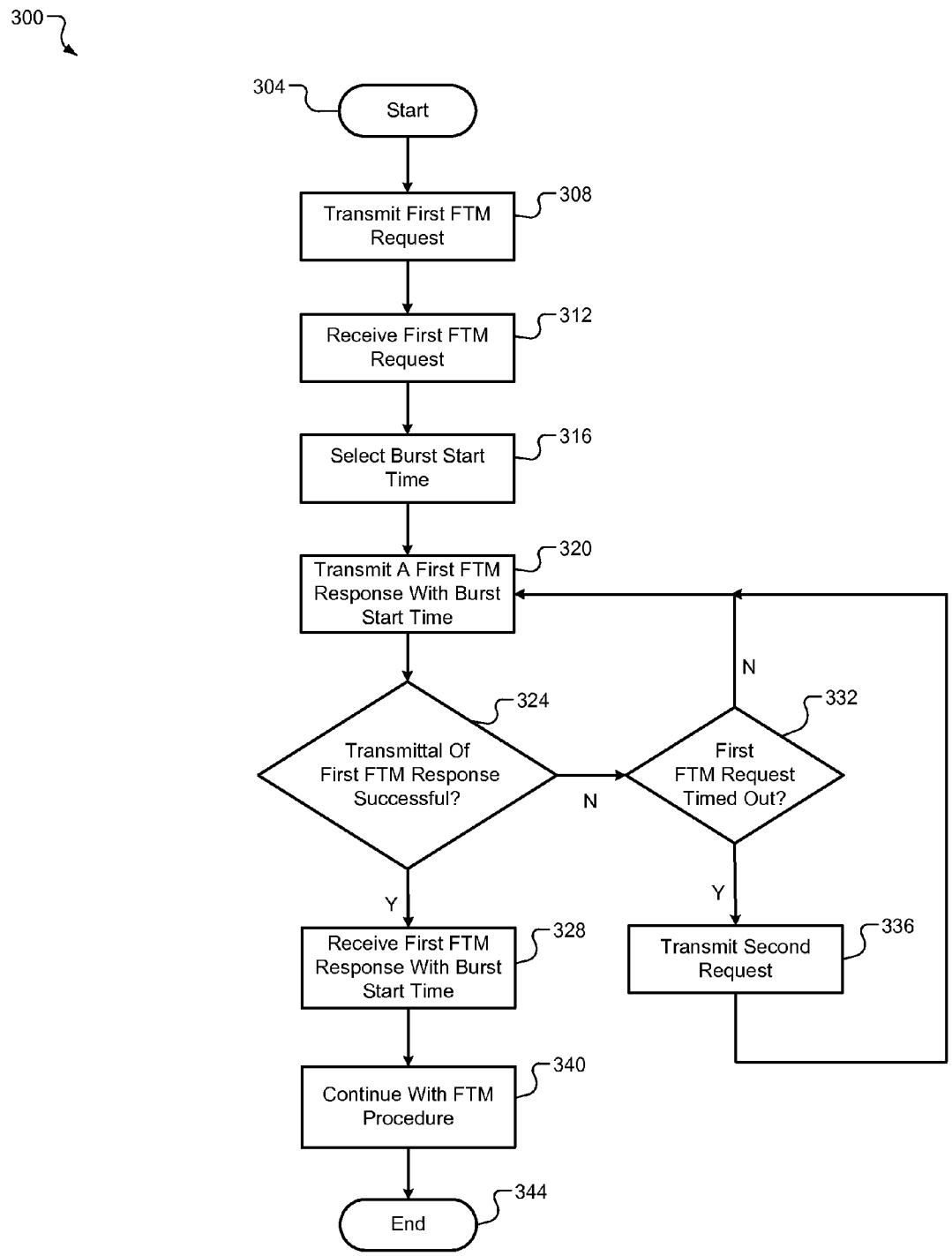
FIG. 8 illustrates steps of an example method for performing an FTM procedure.

FIG. 8 shows an example method 300 for performing an FTM procedure according to the principles of the present disclosure. The method 300 begins at 304. At 308, the method 300 transmits a first FTM request. For example, an FTM module of a requesting station (STA2) generates the first FTM request to be transmitted from STA2. The first FTM request may include an absolute burst start time selected by STA2. The absolute burst start time may correspond to a TSF time of STA2. At 312, a receiving station (STA1) receives the first FTM request. At 316, STA1 selects either the burst start time in the first FTM request or a burst start time based on as TSF time of STA1.

At 320, STA1 attempts to transmit a first FTM response including the selected burst start time. At 324, the method 300 determines whether the attempt to transmit the first FTM response was successful. For example, STA1 may not be able to transmit the first FTM response if the transmission medium is busy. If true, the method 300 continues to 328. If false, the method 300 continues to 332. At 332, the method 300 determines whether the first FTM request timed out. For example, STA2 may determine that the first FTM request timed out if the first FTM response is not received within a predetermined period. If true, the method 300 continues to 336. If false, the method 300 continues to 320. At 336, STA2 may transmit a second FTM request and the method 300 continues to 320. At 320 the method 300 may continue to attempt to transmit the first FTM response from STA1. In embodiments, STA1 may discard the second FTM request or attempt to transmit a second FTM response in addition to the first FTM response.

At 328, STA2 receives the first FTM response including burst start time selected by STA1. At 340, STA1 and STA2 continue with the FTM procedure and corresponding measurements using the burst start time selected by STA1. The method 300 ends at 344.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first wireless communication device in a wireless network including the first wireless communication device and a second wireless communication device, the first wireless communication device comprising:
   a timing module configured to provide a timing synchronization function (TSF) time, wherein values of the TSF time correspond to a common time shared between the first wireless communication device and the second wireless communication device; and
   a fine timing measurement module configured to
      receive, from the second wireless communication device, a first request to perform a fine timing measurement to determine a distance between the first wireless communication device and the second wireless communication device,
      transmit, in a first attempt, a first response including a first value of the TSF time, wherein the first value of the TSF time indicates a first time to start a burst period for performing the fine timing measurement, and wherein the first value of the TSF time is one of (i) included in the first request received from the second wireless communication device and (ii) selected by the timing module,
      determine whether transmitting the first response in the first attempt was successful,
      in response to a determination that transmitting the first response in the first attempt was not successful, retransmit, in a second attempt subsequent to the first attempt, the first response including the same first value of the TSF time, and
      regardless of whether transmitting the first response in the first attempt was successful, perform the fine timing measurement in the burst period starting at the first time indicated by the first value of the TSF time.

2. The first wireless communication device of claim 1, wherein, in a master and slave relationship between the first communication device and the second communication device, one of the first communication device and the second communication device corresponding to a master device selects the first value of the TSF time.

3. The first wireless communication device of claim 1, wherein, in a peer to peer relationship between the first communication device and the second communication device, the first communication device selects the first value of the TSF time.

4. The first wireless communication device of claim 1, wherein the fine timing measurement module is configured to (i) receive, from the second wireless communication device, a second request to perform the fine timing measurement and (ii) transmit a second response including the first time to start the burst period for performing the fine timing measurement.

5. A system comprising the first wireless communication device of claim 1, and further comprising the second wireless communication device, wherein the second wireless communication device is configured to (i) receive the first response from the first wireless communication device and (ii) perform the fine timing measurement in the burst period starting at the first time included in the first response.

6. The system of claim 5, wherein the second wireless communication device is configured to (i) transmit a second request to perform the fine timing measurement if the second wireless communication device does not receive the first response within a predetermined period, (ii) receive the first response subsequent to transmitting the second request, and (iii) perform the fine timing measurement in the burst period starting at the first time included in the first response.

7. A method of operating a first wireless communication device in a wireless network including the first wireless communication device and a second wireless communication device, the method comprising:
   providing a timing synchronization function (TSF) time, wherein values of the TSF time correspond to a common time shared between the first wireless communication device and the second wireless communication device;
   receiving, from the second wireless communication device, a first request to perform a fine timing measurement to determine a distance between the first wireless communication device and the second wireless communication device;
   transmitting, in a first attempt, a first response including a first value of the TSF time, wherein the first value of the TSF time indicates a first time to start a burst period for performing the fine timing measurement, and wherein the first value of the TSF time is one of (i) included in the first request received from the second wireless communication device and (ii) selected by the first wireless communication device;
   determining whether transmitting the first response in the first attempt was successful;
   in response to a determination that transmitting the first response in the first attempt was not successful, retransmitting, in a second attempt subsequent to the first attempt, the first response including the same first value of the TSF time; and regardless of whether transmitting the first response in the first attempt was successful, performing the fine timing measurement in the burst period starting at the first time indicated by the first value of the TSF time.

8. The method of claim 7, wherein, in a master and slave relationship between the first communication device and the second communication device, one of the first communication device and the second communication device corresponding to a master device selects the first value of the TSF time.

9. The method of claim 7, wherein, in a peer to peer relationship between the first communication device and the second communication device, the first communication device selects the first value of the TSF time.

10. The method of claim 7, further comprising:
receiving, from the second wireless communication device, a second request to perform the fine timing measurement; and
transmitting a second response including the first time to start the burst period for performing the fine timing measurement.

11. The method of claim 7, further comprising, at the second wireless communication device:
receiving the first response from the first wireless communication device; and
performing the fine timing measurement in the burst period starting at the first time included in the first response.

12. The method of claim 11, further comprising, at the second wireless communication device:
transmitting a second request to perform the fine timing measurement if the second wireless communication device does not receive the first response within a predetermined period;
receiving the first response subsequent to transmitting the second request; and
performing the fine timing measurement in the burst period starting at the first time included in the first response.

* * * * *